United States Patent
Rapp et al.

(10) Patent No.: US 9,229,922 B2
(45) Date of Patent: Jan. 5, 2016

(54) TOKEN REPRESENTATION OF REFERENCES AND FUNCTION ARGUMENTS

(75) Inventors: Peter William Rapp, Pittsburgh, PA (US); Maxence Lloyd Crossley, Pittsburgh, PA (US); Christopher Douglas Weeldreyer, San Carlos, CA (US)

(73) Assignee: APPLE INC., Cupertino, CA (US)

( * ) Notice: Subject to any disclaimer, the term of this patent is extended or adjusted under 35 U.S.C. 154(b) by 1385 days.

(21) Appl. No.: 12/286,734

(22) Filed: Sep. 30, 2008

(65) Prior Publication Data

US 2010/0083089 A1    Apr. 1, 2010

(51) Int. Cl.
  *G06F 17/00*  (2006.01)
  *G06F 17/24*  (2006.01)
  *G06F 17/21*  (2006.01)

(52) U.S. Cl.
  CPC .............. *G06F 17/246* (2013.01); *G06F 17/21* (2013.01)

(58) Field of Classification Search
  CPC ..... G06F 17/246; G06F 17/245; G06F 17/21; G06F 17/30896
  USPC .................. 715/212, 227, 217–220
  See application file for complete search history.

(56) References Cited

U.S. PATENT DOCUMENTS

| | | | | |
|---|---|---|---|---|
| 5,603,021 | A * | 2/1997 | Spencer et al. | 1/1 |
| 5,874,952 | A * | 2/1999 | Morgan | 715/835 |
| 5,987,481 | A * | 11/1999 | Michelman et al. | 715/219 |
| 7,752,536 | B2 * | 7/2010 | Megiddo et al. | 715/216 |
| 2004/0205524 | A1 * | 10/2004 | Richter et al. | 715/503 |
| 2005/0066265 | A1 * | 3/2005 | Kotler et al. | 715/503 |
| 2007/0101252 | A1 * | 5/2007 | Chamberlain et al. | 715/503 |
| 2009/0024940 | A1 * | 1/2009 | Zeringue et al. | 715/763 |
| 2009/0044091 | A1 * | 2/2009 | Gur et al. | 715/212 |
| 2011/0035653 | A1 * | 2/2011 | Vigesaa et al. | 715/217 |
| 2013/0031495 | A1 * | 1/2013 | Wang et al. | 715/764 |

OTHER PUBLICATIONS

Microsoft Excel 2002(herein Excel), copyright 2002, pp. 1-16.*
Microsoft Excel 2002 printout (hereinafter Excel), copyright 2002, pp. 1-14.*

* cited by examiner

*Primary Examiner* — Thu Huynh
(74) *Attorney, Agent, or Firm* — Fletcher Yoder PC

(57) ABSTRACT

A token representation of references and function arguments is disclosed. In some embodiments, an indication that a formula is being entered into a cell is received, and references and/or function arguments in the formula, if any, are represented as tokens. Each token comprises an atomic user interface object. In various embodiments, references are rendered as reference tokens and function arguments are rendered as argument tokens and/or mode tokens.

20 Claims, 4 Drawing Sheets

| | A | B | C | + |
|---|---|---|---|---|
| 1 | 4 | 0 | 5 | |
| 2 | 7 | 2 | 2 | |
| 3 | =(A1:B2) | (x)(✓) 6 | | + |
| + | | | | |

|   | A | B | C |
|---|---|---|---|
| 1 | 3 |   |   |
| 2 | 5 |   |   |
| 3 | 1 |   |   |
| 4 | 9 |   |   |
| 5 | 6 |   |   |
| 6 | =(A3) |   |   |

FIG. 1A

|   | A | B | C |
|---|---|---|---|
| 1 | 4 | 0 | 5 |
| 2 | 7 | 2 | 2 |
| 3 | =(A1:B2) | 6 |   |

FIG. 1B

|   | Red | Yellow | Blue |
|---|---|---|---|
| Squares | 4 | 6 | 7 |
| Circles | 8 | 3 | 2 |
| Triangles | 5 | 1 | 5 |
| Rectangles | 9 | 4 | =(Red) |

FIG. 1C

TOKEN REPRESENTATION OF REFERENCES AND FUNCTION ARGUMENTS

BACKGROUND OF THE INVENTION

In existing spreadsheet applications, cell references in formulas and/or arguments in functions typically are represented in plain text. For example, a formula to add the value in a cell in column A, row 2 with a value in a cell located in column C, row 24 might be represented in a spreadsheet as A2+C24, with the "A2" and "C24" comprising plain text.

BRIEF DESCRIPTION OF THE DRAWINGS

Various embodiments of the invention are disclosed in the following detailed description and the accompanying drawings.

FIGS. 1A-1J illustrate embodiments of various features and behaviors of tokens with respect to formulas.

DETAILED DESCRIPTION

Figure 1D:

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, the term "cell" refers to a cell associated with at least standard spreadsheet functionality. The term "at least standard spreadsheet functionality" in the context of a cell includes the ability to define the content of one cell in such a way that the content of the one cell is determined based at least in part on the content of one or more other cells, and the content of the one cell is updated automatically without further human action if the content of one or more of the one or more other cells is changed. As used herein, the term "host cell" refers to a cell in a formula editing mode, i.e., a cell into which a formula is being entered. A formula may comprise one or more predefined and/or custom functions. The definition of a function may comprise one or more required and/or optional arguments. In various embodiments, a formula may comprise any spreadsheet operation that requires a computation and/or retrieval and/or analysis of data in one or more cells, e.g., in some cases other than the corresponding host cell. In some embodiments, cells in a spreadsheet application are organized into one or more individual tables or table objects, each of which includes a desired number of rows and columns of cells. In such cases, a sheet of a spreadsheet document may include a desired number of table objects as well as other objects such as charts, graphs, images, etc. Although in many of the examples described herein the cells of a spreadsheet application are organized into such table objects, the techniques described herein may be similarly employed with respect to other cell configurations or organizations, such as the (seemingly) infinite single grid or table of cells in each sheet of some typical spreadsheet applications that includes an unlimited (or very large) number of rows and columns of cells. Although many of the examples provided herein are with respect to a spreadsheet application, the techniques described herein may be similarly employed with respect to any application, spreadsheet or otherwise.

A token representation of references and function arguments is disclosed. As used herein a "token representation" refers to the encapsulation of a reference or argument into an atomic user interface object or unit. The representation of a reference or argument as a graphic token rather than as plain text may simplify various operations. For example, selection of a plain text reference or argument requires the selection of the entire associated text, which may be especially tedious if the reference or argument is lengthy and/or includes spaces. A token, in contrast, may be selected via a single selection operation, e.g., a single click. Cut and paste operations are required to move or reposition plain text references or arguments. A token, in contrast, may be dragged and/or dropped to a desired position, although cut and paste operations may also be employed with a token if desired. Furthermore, the representation of a reference or argument as a graphic token allows a variety of user interface object features and behaviors to be associated with the reference or argument that may not be possible for plain text representations. For instance, a token may be associated with one or more menus. For example, a token may be associated with a menu for selecting allowable values and/or reference permutations, a token may be associated with a menu of actions that may be performed with respect to the token, etc. In some cases, a token may be associated with a pop-up tool tip describing the token that may be presented in response to an indication of interest in the token, such as when the token is moused over. In various embodiments, any appropriate (and in some cases user definable) visual style may be selected for rendering a token, and different visual styles may be selected for different types of tokens. As indicated by the given examples, a token representation provides an enhanced user interface experience both in functionality and visual presentation.

In some embodiments, reference tokens are employed to manipulate cell references, for example, in formulas. A cell reference refers to one or more cells. In various embodiments, a reference may refer to a single cell, a plurality of cells, a range or span of cells, a row of cells, a column of cells, an entire table of cells, body cells of a table, etc. FIGS. 1A-1J illustrate embodiments of various features and behaviors of tokens with respect to formulas. Although some of the examples in FIGS. 1A-1J are described with respect to reference tokens, similar features and/or behaviors may be associated with other types of tokens, such as argument tokens and mode tokens, which are further described below.

FIG. 1A illustrates an embodiment of inserting into a formula a reference token that refers to a single cell. As depicted in the given example, a formula is being entered into host cell A6. In some embodiments, a formula editing mode is entered with respect to a host cell by clicking on or otherwise selecting the cell and entering an equals sign "=". In FIG. 1A, selection of cell A3 results in a reference token that refers to that cell to be inserted into the formula. FIG. 1B illustrates an embodiment of inserting into a formula a reference token that refers to a range of cells. As depicted in the given example, a formula is being entered into host cell A3, and selection of cell range A1:B2 results in a reference token that refers to that range to be inserted into the formula. FIG. 1C illustrates an embodiment of inserting into a formula a reference token that refers to a column of cells. As depicted in the given example, a formula is being entered into host cell Blue Rectangles, and selection of column header cell Red results in a reference token that refers to that column to be inserted into the formula. In some embodiments, the reference of a reference token may be changed by selecting the token and selecting the desired cell (range) and/or by specifying (e.g., manually entering) the desired cell reference in the token.

Figure 1E:
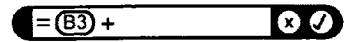

FIG. 1D and FIG. 1E illustrate an embodiment of a manner in which a manually entered (e.g., typed) plain text reference in a formula is transformed into a reference token. In FIG. 1D, a plain text cell reference is being entered into a formula. In response to an indication that the plain text entry is complete, the plain text reference is (automatically and/or dynamically) transformed into a reference token as depicted in FIG. 1E. In the given example, the subsequent entry of an operator (i.e., the addition operator in FIG. 1E) into the formula serves as an indication that the preceding plain text cell reference is complete. In various embodiments, any appropriate action (e.g., the entry of an operator into the formula, the entry of a delimiter such as a space or comma into the formula, the selection of another cell or cell range, etc.) may serve as an indication that a preceding plain text entry is complete.

Figure 1F:
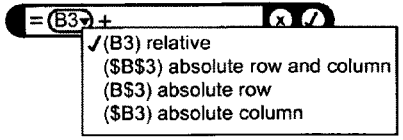

FIG. 1F illustrates an embodiment of a menu that may be associated with a token. In various embodiments, one or more menus may be associated with a token. A menu associated with a token may be accessed by showing an indication of interest in the token, e.g., by mousing over the token, clicking on the token, etc. In some such cases, a menu selection control is provided in the token in response to an indication of interest in the token. In the example of FIG. 1F, a menu providing easy selection of the various permutations of relative and absolute properties of a cell reference is associated with the B3 reference token. Such a menu makes the relative and absolute properties of cell references more discoverable to new users unfamiliar with the "$" notation in cell references, and, in some embodiments, may be associated with various types of reference tokens.

Figure 1G:
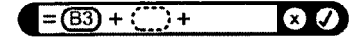

FIG. 1G illustrates an embodiment of toggling to a keyboard reference insertion mode when in a formula editing mode. In some embodiments, a prescribed toggle key (e.g., the Option key) may be employed to toggle between a keyboard reference insertion mode and a normal editing mode. The reference insertion mode allows new references to be added into a formula via one or more keyboard keys (e.g., the arrow keys) and in some cases is entered by holding down a prescribed toggle key. In such cases, the reference insertion mode may be exited and a normal editing mode resumed by releasing the prescribed toggle key. As depicted in FIG. 1G, in some embodiments, entering into a keyboard reference insertion mode results in a throbbing token to be (automatically) inserted into the formula and/or in response to a selection of one or more keyboard keys (e.g., the arrow keys) associated with reference insertion in this mode. In some embodiments, a default and/or context-sensitive operator or delimiter (e.g., the addition operator in FIG. 1G) may be automatically inserted after the throbbing token. In some embodiments, the throbbing token provides a visual indication that the keyboard is in a reference insertion mode rather than a normal editing mode. In some embodiments, a blank token such as the throbbing token in FIG. 1G comprises a placeholder token and is transformed into a reference token when a desired cell (range) is selected and/or when a desired cell reference is manually specified with respect to the token.

Figure 1H:
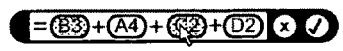
Figure 1I:
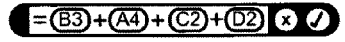
Figure 1J:
Figure 1J:
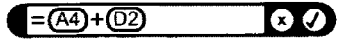

In various embodiments, a set of contiguous or noncontiguous tokens may be selected as a group. FIG. 1H, FIG. 1I, and FIG. 1J illustrate embodiments of manipulating a set of tokens as a group. In FIG. 1H, tokens B3 and C2 are simultaneously selected as a group. In FIG. 1I, the group of tokens selected in FIG. 1H is copied and pasted and may be moved to any desired location, such as into a formula of another cell. In FIG. 1J, the group of tokens selected in FIG. 1H is dragged out of the depicted host cell (or cut and pasted) and may be moved to any desired location, such as into a formula of another cell. As depicted in the examples of FIG. 1I and FIG. 1J, in some embodiments, the relative spacing between tokens at the time of selection is maintained when multiple tokens are selected and manipulated as a group.

In various embodiments, any desired visual representation may be employed to render a token. Different types of tokens may have different visual representations. In some embodiments, the visual representation of a token may be user-definable and/or selectable, e.g., via an associated interface. For example, a token may be resized as desired, the font size and style of a token may be changed, the color of a token may be changed, etc. In some embodiments, an outline surrounding the cell (range) to which a token refers to and the outline and/or fill color of a token are both (automatically) colored a same unique color to provide a visual indication of the cell (range) with which the token is associated.

A formula may include a predefined function. In various embodiments, a function may be entered into a formula by manually typing the function name if it is known, or a desired function may be selected from a function library or other interface for insertion into a formula. In some such cases, the arguments of a newly entered or inserted function are at least initially represented in the formula by argument tokens, e.g., before values and/or references for the arguments of the function are selected or specified. In some embodiments, argument tokens are placeholders that provide visual indications of the order and type of arguments expected by a function. As such, an argument token in a function needs to be replaced by a value or a cell reference for a function to be valid. In some embodiments, argument tokens may have one or more unique visual characteristics for easy identification of the type of the argument. For example, required arguments of a function may be represented by argument tokens having a prescribed color (e.g., dark gray) while optional arguments of a function may be represented by argument tokens having a different prescribed color (e.g., light gray). In some embodiments, optional argument tokens may be deleted from the argument list of a function if the associated arguments are not desired to be specified. FIGS. 2A-2D illustrate embodiments of various features of the token representation of function arguments.

Figure 2A:
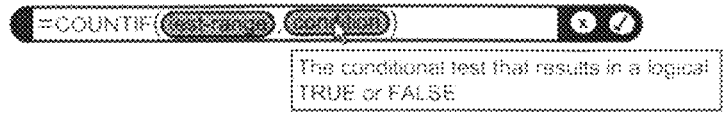
FIGS. 2A-2D illustrate embodiments of various features of the token representation of function arguments.

FIG. 2A illustrates the manner in which a function is represented when it is entered or inserted into a formula. As depicted in the given example, the arguments of the function are represented by argument token stand-ins that specify the types and order of arguments expected by the function. In some embodiments, a pop-up tool tip may be associated with an argument token that describes the argument and what the function is expecting for the argument. The tool tip may be presented in response to an indication of interest in the argument token, such as a mouse over of the token. In the example of FIG. 2A, each of the argument tokens of the COUNTIF function are shaded dark gray, which signifies that each is a required argument of the function. Values and/or references for the argument tokens of a function may be specified in any order. In some cases, an argument token is replaced by a reference token. For example, the selection of an argument token and the subsequent selection of a cell (range) transforms the argument token into a reference token that refers to the selected cell (range). Alternatively, a cell reference may be manually entered (e.g., typed) into an argument token, which transforms it into a reference token. In some embodiments, a value may be manually entered into an argument token instead of a reference. In such cases, the value may be represented in the formula by plain text or a token in different embodiments. In some embodiments, a tool tip associated with an argument token is continued to be associated with the token even after it has been replaced so that a description of the argument can easily be accessed from the function.

Figure 2B:
Figure 2C:

Some function arguments have only a small set or range of allowed values or "modes". For example, a Boolean argument always has a value of "true" or "false" (or "1" or "0"). In some embodiments, such function arguments are represented by mode tokens. A mode token is an argument token that is associated with a menu from which an allowed value for the argument being represented by the mode token can be selected or specified. FIG. 2B illustrates a function that includes mode tokens. Specifically, the COUPDAYSBS function in the given example includes two regular argument tokens (settle and maturity) and two mode tokens (frequency and day count), which each include a menu selection control for accessing an associated menu of allowable values. As in FIG. 2A, each of the argument tokens is shaded (e.g., gray) to visually indicate that it is an argument token, and the shading of the "day count" token is dimmer or lighter relative to the other tokens to indicate that it corresponds to an optional argument. FIG. 2C illustrates the allowable modes or values of the "frequency" token. In some embodiments, a mode or value in the menu may be associated with a tool tip that further describes the mode or value. In FIG. 2C, a selection of (or other indication of interest in) the "semiannual (2)" mode results in an associated tool tip to be presented. Like a regular argument token, a mode token is a placeholder and needs to be replaced by a valid value, e.g., via selection from an associated menu. In some embodiments, a value for a mode token may only be specified from an associated menu to prevent errors from occurring. In some embodiments, a mode token may be replaced by a reference token that refers to a cell having an allowable value or a value may be manually entered into the mode token.

Figure 2D:
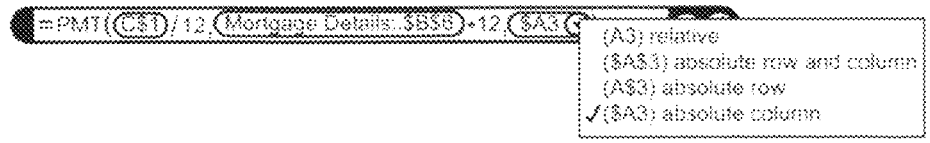

FIG. 2D illustrates a function whose argument tokens have all been replaced by reference tokens. As depicted, the tokens in the PMT function are no longer shaded a color associated with argument tokens (e.g., gray) since they are no longer argument placeholder tokens but actual reference tokens. In some embodiments, each of the reference tokens in the function may be of a prescribed color that corresponds to the color of the outline of the cell (range) to which the reference token refers. FIG. 2D also illustrates the absolute/relative reference properties menu associated with at least some types of reference tokens as previously described in relation to FIG. 1F.

Figure 3A:
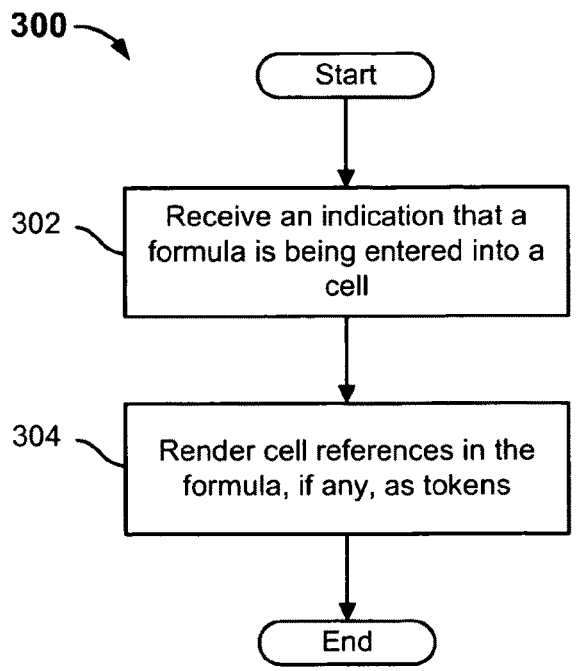
FIG. 3A illustrates an embodiment of a process for representing references as tokens.

FIG. 3A illustrates an embodiment of a process for representing references as tokens. For example, process 300 may be employed with the examples of FIGS. 1A-1J and FIG. 2D. Process 300 starts at 302 at which at an indication that a formula is being entered into a cell is received. A formula editing mode may be entered in a host cell, for example, by clicking on or otherwise selecting the cell and entering an equals sign "=". At 304, cell references in the formula, if any, are represented or rendered as tokens. For example, a cell reference may be represented by a reference token as described above. Process 300 subsequently ends.

Figure 3B:
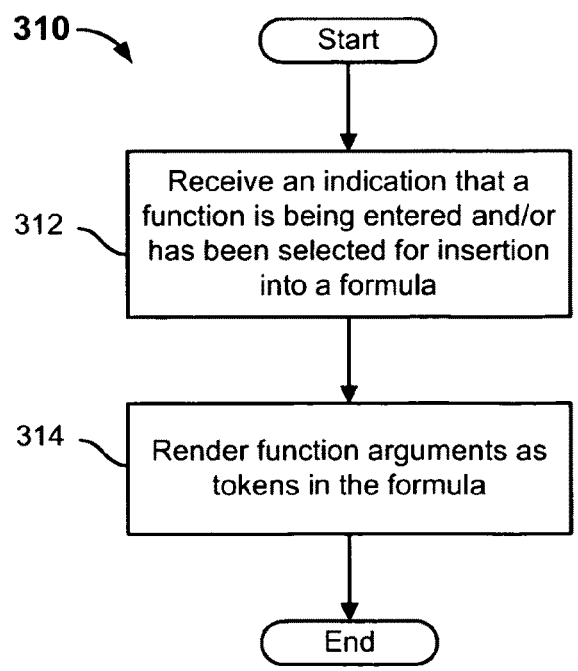
FIG. 3B illustrates an embodiment of a process for representing function arguments as tokens.

FIG. 3B illustrates an embodiment of a process for representing function arguments as tokens. For example, process 310 may be employed with the examples of FIGS. 2A-2D. Process 310 starts at 312 at which at an indication that a function is being entered (e.g., typed) and/or has been selected for insertion into a formula is received. For example, a function may be selected for insertion into a formula from a function library. At 314, the arguments of the function are represented or rendered as tokens in the formula. For example, each argument may be represented by a regular argument token or a mode token as described above. Process 310 subsequently ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer program product embodied in a non-transitory computer readable storage medium and comprising computer instructions for:
   receiving entry of a formula directly into a cell of a spreadsheet;
   receiving an indication to include a reference or an argument in the formula being entered into the cell, wherein receiving the indication comprises receiving a plain text entry of the reference or the argument into the formula; and
   in response to receiving the indication to include the reference or the argument in the formula being entered into the cell, automatically inserting into the formula inside the cell a user interface object to represent the reference or the argument wherein the user interface object is configured to perform one or more features or behaviors not performed by plain text, when the user interface object appears inside the cell, wherein the automatically inserting the user interface object into the formula inside the cell comprises automatically transforming the plain text entry into the user interface object.

2. The computer program product recited in claim 1, wherein the reference refers to one or more of: a single cell, a plurality of cells, a range or span of cells, a row of cells, a column of cells, body cells of a table, and all cells of a table.

3. The computer program product recited in claim 1, wherein the indication comprises a selection of one or more cells and wherein the automatically inserted user interface object in the formula inside the cell comprises a reference user interface object that refers to the selected cells.

4. The computer program product recited in claim 1, wherein the argument comprises a function argument and wherein the user interface object comprises an argument user interface object.

5. The computer program product recited in claim 4, wherein the argument user interface object comprises a placeholder user interface object that represents a position of the argument in an argument list of the function and indicates a type of data expected for the argument.

6. The computer program product recited in claim 5, further comprising computer instructions for replacing the argument user interface object with a reference user interface object, a value user interface object, or a plain text value.

7. The computer program product recited in claim 4, wherein the argument user interface object comprises a mode user interface object and wherein the mode user interface object is associated with a menu from which an allowed value for the argument being represented by the mode user interface object can be selected.

8. The computer program product recited in claim 1, wherein the user interface object comprises an atomic user interface object.

9. The computer program product recited in claim 1, wherein the one or more features or behaviors include: allowing selection of the user interface object using a single select operation; allowing the user interface object to be dragged and/or dropped to a desired position; allowing a set of user interface objects to be simultaneously selected and moved as a group; allowing a menu to be associated with the user interface object; allowing a tool tip to be associated with one or more of a function, the user interface object, and a menu option associated with the user interface object; rendering different types of user interface objects in different visual styles; coloring a reference user interface object and an associated cell or cell range outline in a same unique color; allowing toggling between a keyboard reference insertion mode and normal editing mode via a prescribed toggle key; or providing a throbbing user interface object as a visual indication of being in a keyboard reference insertion mode; or any combination thereof.

10. The computer program product recited in claim 1, wherein the user interface object is configured to be cut from one position and pasted into another position within the spreadsheet.

11. A system, comprising:
a processor configured to:
receive entry of a formula directly into a cell of a table of a document;
receive an indication to include a reference or an argument in the formula being entered into the cell, wherein receiving the indication comprises receiving a plain text entry of the reference or the argument into the formula; and
in response to receiving the indication to include the reference or the argument in the formula being entered into the cell, automatically insert into the formula inside the cell a user interface object to represent the reference or the argument wherein the user interface object is an atomic user interface object that is user-selectable only as a unit, wherein the automatically inserting the user interface object into the formula inside the cell comprises automatically transforming the plain text entry into the user interface object; and
a memory coupled to the processor and configured to provide the processor with instructions.

12. The system recited in claim 11, wherein the indication comprises a selection of one or more cells and wherein the automatically inserted user interface object in the formula inside the cell comprises a reference user interface object that refers to the selected cells.

13. The system recited in claim 11, wherein the argument comprises a function argument and wherein the user interface object comprises an argument user interface object.

14. The system recited in claim 13, wherein the argument user interface object comprises a placeholder user interface object that represents a position of the argument in an argument list of the function and indicates a type of data expected for the argument.

15. The system recited in claim 11, wherein the user interface object is associated with a menu of a list of actions that are performable with respect to the user interface object.

16. A method, comprising:
receiving entry of a formula directly into a cell of a spreadsheet;
receiving an indication to include a reference or an argument in the formula being entered into the cell, wherein receiving the indication comprises receiving a plain text entry of the reference or the argument into the formula; and
in response to receiving the indication to include the reference or the argument in the formula being entered into the cell, automatically inserting into the formula inside the cell a user interface object to represent the reference or the argument, wherein the user interface object has one or more features or behaviors not exhibited in plain text, wherein the automatically inserting the user interface object into the formula inside the cell comprises automatically transforming the plain text entry into the user interface object.

17. The method recited in claim 16, wherein the indication comprises a selection of one or more cells and wherein the automatically inserted user interface object in the formula inside the cell comprises a reference user interface object that refers to the selected cells.

18. The method recited in claim 16, wherein the argument comprises a function argument and wherein the user interface object comprises an argument user interface object.

19. The method recited in claim 18, wherein the argument user interface object comprises a placeholder user interface object that represents a position of the argument in an argument list of the function and indicates a type of data expected for the argument.

20. The method recited in claim 19, wherein the placeholder user interface object comprises a throbbing visual indicator inserted into the argument user interface object.

* * * * *